(12) United States Patent
Schmid

(10) Patent No.: US 6,830,690 B2
(45) Date of Patent: Dec. 14, 2004

(54) TWO-STAGE HIGH SYNTHESIS ACTIVATED SLUDGE SYSTEM WITH INTERMEDIATE BIO-SOLIDS REMOVAL

(76) Inventor: Lawrence A. Schmid, 3107 Harahay Ridge, Manhattan, KS (US) 66502

( * ) Notice: Subject to any disclaimer, the term of this patent is extended or adjusted under 35 U.S.C. 154(b) by 37 days.

(21) Appl. No.: 10/245,018

(22) Filed: Sep. 16, 2002

(65) Prior Publication Data

US 2004/0050779 A1 Mar. 18, 2004

(51) Int. Cl.$^7$ .................................................. C02F 3/00
(52) U.S. Cl. ..................... 210/609; 210/151; 210/615; 210/619; 210/221.1; 210/626
(58) Field of Search ........................ 210/609, 615–619, 210/620–626, 150–151, 221.1

(56) References Cited

U.S. PATENT DOCUMENTS

| | | | | |
|---|---|---|---|---|
| 4,268,387 A | * | 5/1981 | Hall | 210/169 |
| 4,351,721 A | * | 9/1982 | Frandsen | 210/150 |
| 5,403,487 A | * | 4/1995 | Lodaya et al. | 210/610 |
| 5,980,738 A | * | 11/1999 | Heitkamp et al. | 210/150 |
| 6,039,873 A | * | 3/2000 | Stahler | 210/605 |
| 2003/0111409 A1 | * | 6/2003 | Austin et al. | 210/602 |

* cited by examiner

Primary Examiner—Chester T. Barry
(74) Attorney, Agent, or Firm—Hovey Williams LLP

(57) ABSTRACT

A process for treating organically contaminated waste water is provided comprising an initial treatment step whereby microorganisms are replicated and either attach to support media or remain suspended in the waste water. The microorganisms reduce the incoming biochemical oxygen demand (BOD) level by consuming the organic contaminants. At least a part of the suspended portion of microorganisms are subsequently removed from the initially treated waste water, and the waste water under goes a further treatment step to further reduce the level of organic contaminants.

13 Claims, 2 Drawing Sheets

TWO-STAGE HIGH SYNTHESIS ACTIVATED SLUDGE SYSTEM WITH INTERMEDIATE BIO-SOLIDS REMOVAL

BACKGROUND OF THE INVENTION

1. Field of the Invention

The present invention is broadly concerned with a process for treating organically contaminated waste water and is particularly suited for applications in which land space available for placement of a waste water treatment facility is limited and when the concentration of organic material is high.

2. Description of the Prior Art

The use of biological treatment systems for treatment of organically contaminated waste water is widespread. These systems utilize naturally occurring microorganisms, primarily bacteria, under controlled conditions to remove organic contaminants. The level of organic contamination is often measured by the amount of oxygen required by the bacteria to stabilize the wastewater, the biochemical oxygen demand (BOD). In essence, BOD denotes the organic material or "food" available to the bacteria.

Particular biological treatment systems are designed based upon the objectives for treatment of a particular waste water stream. The primary objective of any such system is to meet the minimum effluent treatment standards set by a particular industry or regulatory agency. Further design optimizations can be made in order to achieve various other secondary objectives such as minimizing energy, operating costs, capital expense, sludge production, and land space required.

Conventional biological treatment systems use activated sludge to provide bacteria for waste water treatment. The activated sludge generally comprises biosolids recycled from subsequent steps in the treatment process. In conventional activated sludge systems, waste water is fed into an aeration tank in which a large population of bacteria are grown in suspension. The bacteria are allowed to consume the organic material until an appropriate BOD level has been reached. The heavier biosolids are then separated from the effluent and a portion of the biosolids or sludge is recycled to the aeration tank. The remaining sludge is purged from the system and undergoes additional treatment and ultimate disposal. This process typically requires relatively large-capacity aeration tanks and large hydraulic retention times, often exceeding 24 to 36 hours.

In certain applications, land space available for placement of a waste water treatment facility is limited. Therefore, smaller aeration tanks with shorter hydraulic residence times are highly desirable. In order to employ such smaller tanks, it is necessary that BOD removal occur rapidly. It has been found that the most rapid BOD removal by microorganisms occurs during the log phase of microorganism growth. During the log phase, the microorganisms grow at a logarithmic rate, rapidly increasing their numbers. The log phase occurs when the dissolved oxygen is plentiful and the BOD is in excess of what the microorganisms can consume. In order to sustain this rapid growth rate, the microorganisms rapidly consume and metabolize the organic material removing it from the waste water.

Using conventional technology, it is difficult to operate a waste water system in the log phase of microorganism growth. If, during the use of small tanks with short residence times, bacteria were to remain in suspension during the treatment process, they would be hydraulically washed out of the system as fast as they could be grown, and a sufficiently large population of bacteria to rapidly reduce BOD levels could not be achieved. Therefore, it is desirable that only excess bacteria be flushed into the solids removal phase of the activated sludge system.

There is a need in the art for a waste water treatment process capable of effectively removing organic contaminants from waste water while utilizing smaller tanks than conventional activated sludge processes.

SUMMARY OF THE INVENTION

The present invention overcomes the problems noted above and provides a process for treating organically contaminated waste water having an incoming biochemical oxygen demand (BOD) level. Generally, a process according to the invention comprises initially treating the waste water in the presence of microorganisms (preferably bacteria) capable of utilizing the organic contaminants for microorganism replication, oxygen, and support media for the microorganisms, and causing the microorganisms to replicate and thereby reduce the incoming BOD level. A first portion of the microorganisms adhere to the support media, and a second portion of the microorganisms remain suspended in the waste water. Following the initial treatment step, at least part of the second suspended portion of the microorganisms are removed from the initially treated waste water, and after the removal step, the waste water is further treated in the presence of the microorganisms and oxygen to further reduce the BOD level.

The initial treatment step is preferably carried out during the log phase of microorganism growth. Maintaining log phase growth in systems having small tanks with short residence times is accomplished by growing bacteria on fixed or suspended support media within an aeration tank. Preferred media for use with the invention include synthetic resin pellets (preferably porous) providing large surface areas, suspended fabric segments, or any similar device which provides large surface areas. The microorganisms attach to the media and replicate to the point at which they saturate the media. The excess microorganisms which are grown "slough" off. Even though these microorganisms have detached from the media, they remain suspended in the tank system and continue to remove BOD until they are displaced from the aeration tank system by incoming waste water flow. The initial treatment step reduces the incoming BOD level by at least about 50% and preferably by at least about 75%, and operates with a very short hydraulic retention time, as low as one hour.

Typically, the organically contaminated waste water stream to be treated comprises a number of different organic compounds and materials. It is preferable to use of a variety of microorganism species to remove these compounds and materials from the waste water efficiently. As is well known in the waste water treatment industry, different microorganism species adapt to degrade the material which yields it the most energy. For example, some microorganisms will degrade the BOD of incoming waste water, while others degrade the end product of other microorganisms.

Oxygen may be supplied to the tank by any method known in the art, preferably aeration diffusers through which air is blown. Even more preferably, the aeration diffusers are arranged in a grid proximate the bottom of the aeration tank.

Conventional activated sludge systems tend to operate in what is commonly referred to as the endogenous phase of microorganism growth. In the endogenous phase, biological material is limited and the microorganisms begin to use their own cell mass to maintain their energy level, while others die. When the microorganisms, preferably bacterial, are in the endogenous phase, protozoa develop to consume some of the individual bacteria, while other bacteria produce a polymer which helps to hold the bacterial populations together in bacterial masses which tend to settle under quiescent conditions. This settling is typically performed in a conventional clarifier. Operation of an activated sludge system in the endogenous phase of microorganism growth is generally characterized by the use of large tanks having relatively long hydraulic retention times.

Because the initial treatment step operates in the log phase of microorganism growth, protozoa cannot develop and the suspended bacteria will not produce the polymer enabling them to agglomerate or floc. Preferably, the removal step of the present invention comprises subjecting the suspended portion of the microorganisms to dissolved air flotation in the presence of an added synthetic resin polymer to cause agglomerations of some of the microorganisms in the suspended portion and polymer. The synthetic resin polymer substitutes for the natural polymer produced by the microorganisms during the endogenous phase and aids in flocculation of the microorganisms. The agglomerations are thereafter removed from the initially treated waste water.

Dissolved air flotation is not the only method of removing suspended organisms from the initially treated waste water. In additional preferred emobidments, synthetic resin polymer may be added to the initially treated waste water to cause agglomerations of the microorganisms as in the dissolved air flotation method, however, other mechanical processes such as straining, screening, centrifuging, or a dewatering belt are used to separate the agglomerations from the initially treated waste water.

After the removal step, the waste water (which now contains primarily soluble BOD) is further treated in the presence of microorganisms and oxygen to further reduce the BOD level. Preferably, this further treating step comprises passing the waste water into a second stage activated sludge system. This second stage system is similar in design to a conventional activated sludge system thereby providing sufficient time for microorganism floc formation and conventional settling. By removing microorganisms after the first stage, not only is the BOD associated with these organisms removed, but space is freed up in the second stage to allow for production of solids from degradation of the soluble BOD. Since clarifiers following the second stage have a solids limit, the second stage aeration tanks would have to be much larger if they had to accommodate the solids from the first stage. A portion of the settled microorganisms from the second stage system are recycled back to the initial treatment step to assist in the treatment of additional quantities of waste water. Additional portions of the settled microorganisms are recycled to the second stage activated sludge system.

Because the further treatment step preferably operates similar to a more conventional activated sludge system, the further treatment step is preferably carried out for a period of time longer than the initial treatment step with the further treatment tank being larger than the initial treatment tank. The further treatment step is preferably carried out with hydraulic retention times as low as about 4 hours depending upon the concentration of organic material in the waste water. Furthermore, it is preferable that the initial and further treatment tanks be exposed to ambient air.

By removing a large portion of the biological mass after the initial treatment step, the need for additional oxygen and energy in the further treatment step is greatly reduced, leading to decreased costs for system operation.

DETAILED DESCRIPTION OF THE PREFERRED EMBODIMENT

Figure 1:
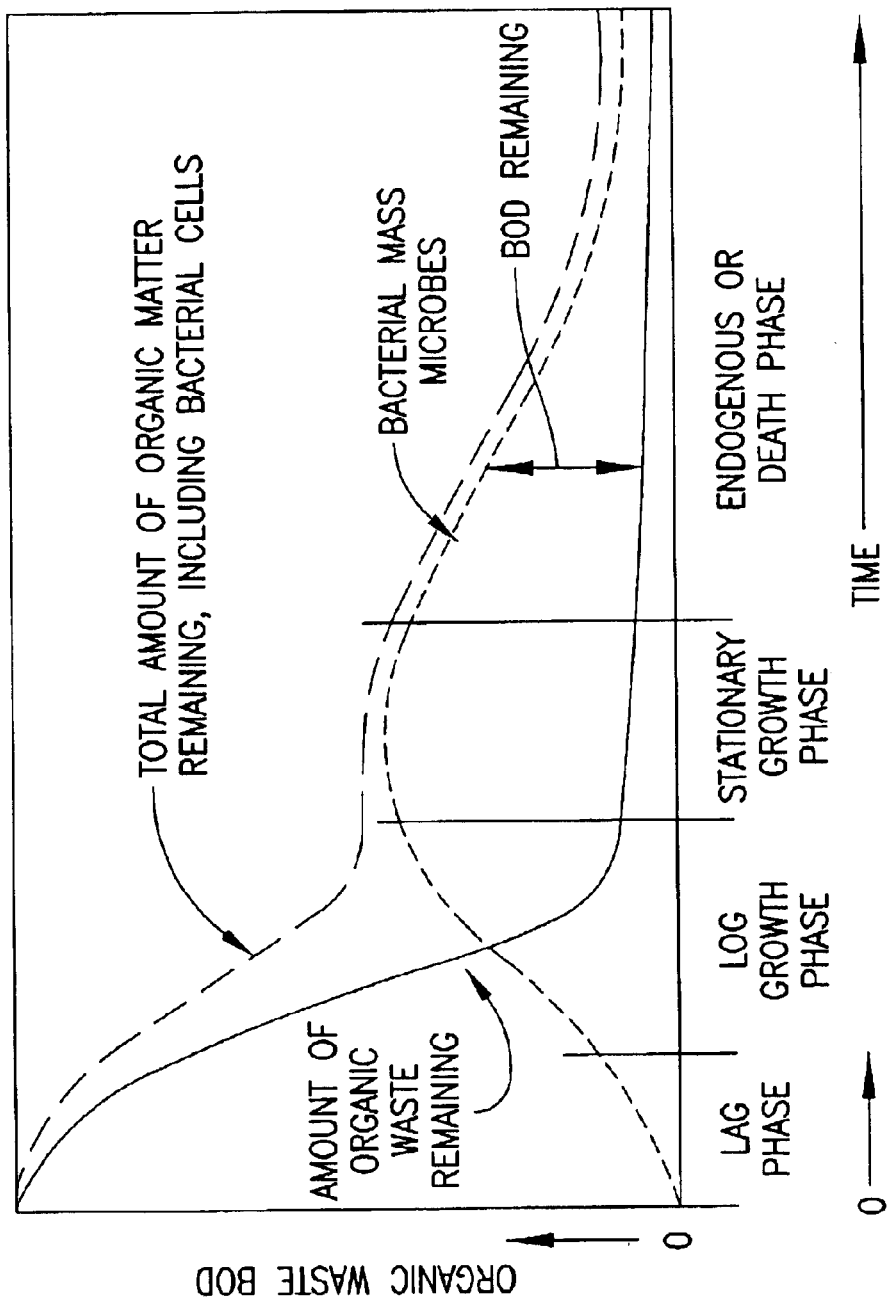
FIG. 1 is a graph illustrating the phases of bacteria growth and organic waste BOD removal for each phase.

FIG. 1 illustrates the various phases of bacteria growth in an activated sludge treatment system. The graph shows the relationship between the amount of organic waste present in the system and bacterial growth throughout the various phases.

The first phase of bacteria growth depicted is the lag phase. When bacteria and waste water are first mixed, there is a short lag period where the bacteria are consuming some BOD, but have not yet started to rapidly multiply. The total amount of organic matter in the waste water is not significantly reduced during this phase.

The second phase of bacteria growth depicted is the log phase. The log phase is characterized by rapid bacteria growth due to plentiful oxygen supply and BOD in excess of what the bacteria are capable of consuming. The amount of organic waste decreases sharply as does the total amount of organic material present in the system.

During the stationary growth phase, the supply of BOD is no longer unlimited. Some bacteria continue to multiply because of continued availability of their preferred food, however other bacteria face a limited food condition and stop multiplying or experience a decline in population. In any event, the net effect is that the bacterial mass neither significantly increases or decreases during this period.

The final phase of bacteria growth depicted in FIG. 1 is the endogenous or death phase. As the food supply becomes more limited to all bacteria, the bacteria begin to use their own cell mass to maintain their energy level. Some bacteria die during this phase and release organic material back into the system to be used by the remaining bacteria. Bacteria in the endogenous phase still require dissolved oxygen in order to metabolize the organic material. The net effect of this phase is the reduction of the bacteria mass as well as the total mass of organic matter in the system. Maximum organic reduction is achieved near the end of the endogenous phase.

Figure 2:
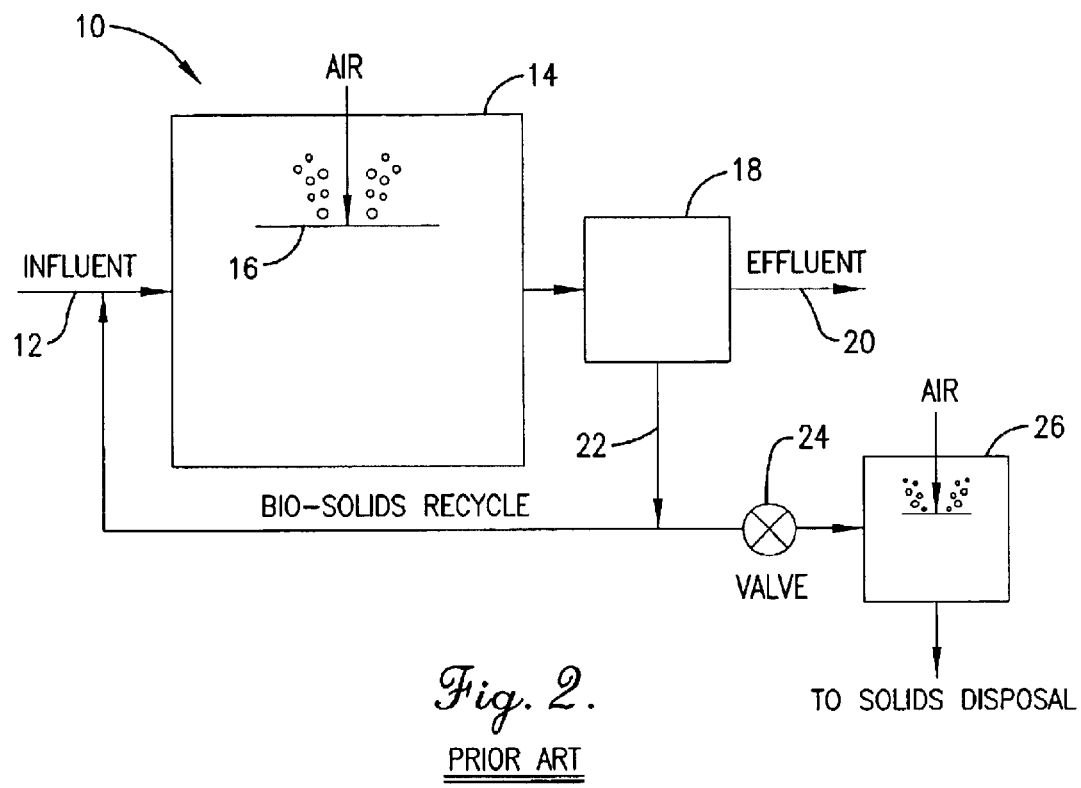
FIG. 2 depicts a prior art waste water treatment process whereby BOD is reduced in a large, initial treatment tank.

FIG. 2 depicts a conventional activated sludge treatment process 10. An influent stream of organically contaminated waste water 12 is fed into aeration tank 14. Tank 14 is fitted with an air diffuser array 16 through which air is blown and oxygen dissolved into the waste water. Bacteria suspended within tank 14 consume organic waste material and oxygen, thereby producing more bacteria and converting the waste water BOD into carbon dioxide and water. Tank 14 operates in the endogenous phase of bacteria growth depicted in FIG. 1. Over time, the bacteria and biosolids begin to agglomerate or floc together.

The waste water and bacteria mixture is fed into a separate gravity clarifier tank 18. Conditions within tank 18 are generally quiescent thereby enabling the heavier bioso lid flocs to settle to the bottom of tank 18. A clarified effluent stream 20 is skimmed from the top of tank 18 and a pump (not shown) draws a stream of settled biosolids 22 from the bottom of tank 18. Initially, the entirety of stream 22 is recycled to influent stream 12 to provide bacteria for BOD consumption in tank 14. Over time, enough bacteria develop so that in order to maintain an equilibrium of bacteria within the system a portion of stream 22 is diverted via valve 24 to aerobic digester 26 where the biosolids are subjected to further aeration which reduces the biological mass by endogenous respiration. The final mass of biological material is then directed to final disposal which may consist of application to land, landfill disposal, dewatering, or incineration.

Figure 3:
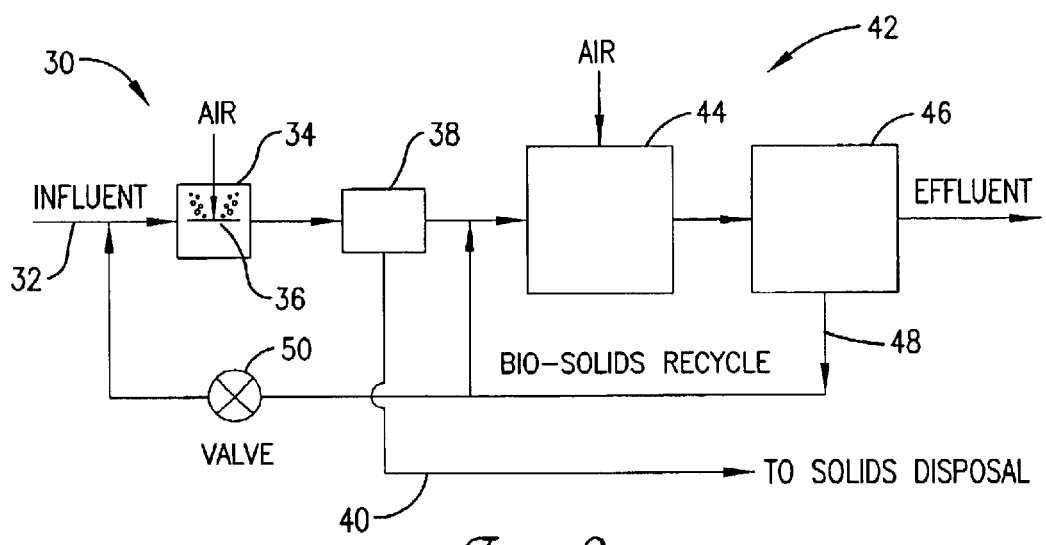
FIG. 3 depicts a waste water treatment process according to the invention.

FIG. 3 depicts a preferred process 30 for treating organically contaminated waste water according to the invention. An influent stream of organically contaminated waste water 32 is fed into an open top tank 34 into which is placed either fixed or suspended media (not shown) to provide a surface for bacteria attachment and growth. In order to supply oxygen to facilitate bacteria growth, air is blown into tank 34 via a grid of aeration diffusers 36 which is preferably located adjacent the bottom of tank 34.

Bacteria attach to and grow on the media thereby increasing the total bacterial mass within tank 34. As new bacteria attach and grow on the media, others are displaced or "sloughed" off. The "sloughed" off bacteria become suspended within tank 34 and remain active in consuming BOD. Given the large number of bacteria present, the high levels of BOD entering tank 34, and the plentiful dissolved oxygen supply provided by diffusers 36, tank 34 operates under conditions of log phase bacteria growth and corresponding rapid BOD reduction. This rapid BOD reduction enables tank 34 to be of significantly less volume than tank 14 in FIG. 2.

As the liquid within tank 34 is displaced by incoming waste water from stream 32, the free microorganisms suspended within the tank are washed out of tank 34 and into flotation tank 38. Bacteria attached to the media remain within tank 34 either because the media itself is fixed within tank 34 or, if the media is suspended, a screen is placed across the outlet of tank 34 prohibiting the media from being displaced into tank 38.

The free microorganisms which are displaced out of tank 34 and into tank 38 are in a mode of very active growth and comprise individual bacterial cells or small groups of cells which have a natural tendency to remain suspended in liquid. Therefore, a conventional gravity clarifier, such as clarifier 18 shown in FIG. 2, is not effective in separating the bacteria from the waste water. The embodiment of the invention depicted in FIG. 3 utilizes a flotation tank 38 in order to separate the bacteria from the waste water, however any similar physical chemical means can be employed, such as straining, screening, centrifuging, or a dewatering belt. With a flotation tank, micro bubbles of air are introduced into tank 38 and operate to float the light bacterial mass to the top surface of tank 38. The micro bubbles may be generated by any method known in the art, but preferably are formed by introducing into tank 38 a water stream which is under pressure and supersaturated with oxygen. When the oxygen supersaturated stream is released to atmospheric pressure, the oxygen comes out of solution in the form of small micro bubbles. A synthetic resin polymer, replacing the natural polymer produced by bacteria in a conventional activated sludge system, may be employed to aid in flocculation and floatation of the bacteria. The bacterial solids are skimmed from the top surface and removed from the system in stream 40 for further treatment and solids disposal. The waste water below the top surface of tank 38 is discharged into a second stage activated sludge system 42.

The second stage activated sludge system 42 is a conventional sludge system similar to that of FIG. 2. The waste water stream from tank 38 enters aeration tank 44. Tank 44 has a sufficiently long residence time to enable bacterial floc formation. Conventional settling of the floc occurs in clarifier tank 46. Clarified effluent is discharged from the top of tank 46 while the settled biosolids are recycled as stream 48 to tank 44. As with the activated sludge system of FIG. 2, the second stage sludge system 42 reaches a state where bacteria being produced is greater than the bacteria required to treat the waste water. When this occurs, valve 50 is opened allowing for flow of the excess biosolid material back to influent stream 32 where the bacteria can assist in BOD removal until they are removed from the system in flotation tank 38.

In addition to having high BOD levels, certain waste water streams contain amounts of ammonia which must be removed prior to discharge into the environment. Removal of ammonia is accomplished by nitrification, that is converting the ammonia to nitrates. If necessary, the nitrates may undergo denitrification thereby producing nitrogen gas. Therefore in preferred embodiments, the second stage activated sludge system 42 may also be configured to carryout nitrification of the ammonia compounds into nitrates. Nitrification is generally not possible in aeration tank 34 of the first stage because nitrifying organisms are slow growing and would be flushed from the first stage faster than their ability to reproduce. Nitrification can be accomplished in systems having low hydraulic retention time if sufficient nitrifying bacteria are present. This is accomplished by having a long sludge age in the second stage system 42. "Sludge age" is defined as the average time that a bacterium remains in the treatment system and is calculated by the quantity of solids, by weight, that is in the system aeration tanks, divided by the weight of solids wasted from the system per day. A sludge age of 30 to 40 days is generally sufficient for nitrifying bacteria to accumulate to significant numbers. In comparison, the first stage of system 30 will generally have a sludge age of under one day. The long sludge age of the second stage system 42 is accomplished because the total amount of solids and BOD entering the second stage 42 is relatively low because of the work of flotation tank 38 in removing biosolids.

EXAMPLES

The following examples set forth hypothetical comparisons between a conventional activated sludge process and the staged, high synthesis process of the invention. It is to be understood, however, that these examples are provided by way of illustration and nothing therein should be taken as a limitation upon the overall scope of the invention.

Example 1

In this example, a high strength industrial waste water is treated using a conventional activated sludge process and, by way of comparison, a method in accordance with the invention. The waste water had a nominal flow rate of 200,000 gallon per day with an incoming BOD of 5,000 mg/l. The following table sets forth the calculated results.

TABLE 1

|  | Conventional Activated Sludge Process | Present Invention | | |
|---|---|---|---|---|
|  |  | 1st Stage | 2nd Stage | Total |
| Flow | 200,000 gpd | 200,000 gpd | 200,000 gpd | 200,000 gpd |
| BOD to tank inlet | 5000 mg/l | 5000 mg/l | 1000 mg/l | 5000 mg/l |
| Expected Effluent BOD | 30 mg/l | 1000 mg/l | 30 mg/l | 30 mg/l |
| Hydraulic Retention Time | 144 hour | 24 hours | 28 hours | 52 hours |
| Volume of tanks | 1,200,000 gal | 200,000 gal. | 233,000 gal. | 433,000 gal. |
| Area at 14' SWD | 11,500 sf | 1,900 sf | 2,225 sf | 4,125 sf |
| Biological sludge production | 2,430 dry pounds | 4,612 dry pounds | 621 dry pounds | 5,233 dry pounds |
| SCFM air required | 4,852 SCFM | 2,765 SCFM | 803 SCFM | 3,568 SCFM |
| HP required for compressed air | 194 HP | 110 HP | 32 HP | 142 HP |

Example 2

Normal domestic waste water having a BOD of 250 mg/l is similarly treated using a conventional activated sludge process and that of the invention. Table 2 sets forth the results.

TABLE 2

|  | Conventional Activated Sludge Process | Present Invention | | |
|---|---|---|---|---|
|  |  | 1st Stage | 2nd Stage | Total |
| Flow | 200,000 gpd | 200,000 gpd | 200,000 gpd | 200,000 gpd |
| BOD to tank inlet | 250 mg/l | 250 mg/l | 50 mg/l | 250 mg/l |
| Expected Effluent BOD | 30 mg/l | 50 mg/l | 30 mg/l | 30 mg/l |
| Hydraulic Retention Time | 24 hours | 1 hour | 4 hours | 5 hours |
| Volume of tanks | 200,000 gal. | 8,300 gal. | 33,300 gal | 41,600 gal. |
| Area at 14' SWD | 1,910 sf | 80 sf | 318 sf | 398 sf |
| Biological sludge production | 138 dry pounds | 314 dry pounds | 25 dry pounds | 339 dry pounds |
| SCFM air required | 245 SCFM | 85 SCFM | 45 SCFM | 130 SCFM |
| HP required for compressed air | 10 HP | 3.5 HP | 2 HP | 5 5 HP |

As the above examples demonstrate, the process according to the present invention requires significantly less total hydraulic retention time allowing the waste water to be treated much more rapidly than the conventional activated sludge process. The process according to the invention utilizes significantly smaller tanks thereby creating a smaller plant footprint, a feature especially important in applications where land space is limited. Furthermore, the process according to the invention requires less diffused air which translates into the ability to use smaller air compressors which consume less energy.

The process according to the invention has one trade off that is apparent from the above examples. The amount of sludge produced from the inventive process is significantly higher than the sludge production associated with the conventional system. However, when land availability and capital expense are overriding concerns, the present invention provides superior results when compared to the conventional activated sludge system.

I claim:

1. A process for treating organically contaminated waste water having an incoming biochemical oxygen demand (BOD) level, comprising the steps of:

initially treating said waste water in the presence of microorganisms capable of utilizing said organic contaminants for microorganism replication, oxygen and support media for the microorganisms, and causing said microorganisms to replicate and thereby reduce said incoming BOD level, with a first portion of the microorganisms adhering to said support media and a second portion of the microorganisms remaining suspended in the waste waters, said initial treatment step being carried out primarily during the log phase of growth of said microorganisms;

removing at least a part of said second suspended portion of said microorganisms from said initially treated waste water; and thereafter further treating said waste water after said removal step in the presence of said microorganisms and oxygen to further reduce said BOD level.

2. The process of claim 1, said further treatment step being carried out for a period of time longer than said initial treatment step.

3. The process of claim 1, said initial and further treatment steps being carried out in individual treatment tanks, said further treatment tank being larger than said initial treatment tank.

4. The process of claim 1, said removal step comprising subjecting said suspended portion of said microorganisms to dissolved air flotation in the presence of added synthetic resin polymer to cause agglomerations of some of the microorganisms in said suspended portion and polymer, and thereafter removing the agglomerations from the initially treated waste water.

5. The process of claim 1, said incoming BOD level being reduced by at least about 50% in said initial treating step.

6. The process of claim 5, said BOD level being reduced by at least about 75% in said initial treating step.

7. The process of claim 1, including the step of recycling some of said microorganisms present in the waste water after said further treatment step back to said initial treatment step to assist in initial treatment of additional quantities of waste water.

8. The process of claim 1, said process being carried out in tanks exposed to ambient air.

9. The process of claim 1, said microorganisms comprising bacteria.

10. The process of claim 1, said support media being selected from the group consisting of synthetic resin pellets and suspended fabric segments.

11. The process of claim 1, said removal step comprising adding a synthetic resin polymer to said initially treated waste water to cause agglomerations of some of the microorganisms in said suspended portion and polymer, and thereafter removing the agglomerations from the initially treated waste water using a method selected from the group consisting of straining, screening, centrifuging, and using a dewatering belt.

12. A process for treating organically contaminated waste water having an incoming biochemical oxygen demand (BOD) level, comprising the steps of:

initially treating said waste water in the presence of microorganisms capable of utilizing said organic contaminants for microorganism replication, oxygen and support media for the microorganisms, and causing said microorganisms to replicate and thereby reduce said incoming BOD level, with a first portion of the microorganisms adhering to said support media and a second portion of the microorganisms remaining suspended in the waste water;

removing at least a part of said second suspended portion of said microorganisms from said initially treated waste water, said removal step comprising subjecting said suspended portion of said microorganisms to dissolved air flotation in the presence of added synthetic resin polymer to cause agglomerations of some of the microorganisms in said suspended portion and polymer, and thereafter removing the agglomerations from the initially treated waste water; and thereafter further treating said waste water after said removal step in the presence of said microorganisms and oxygen to further reduce said BOD level.

13. A process for treating organically contaminated waste water having an incoming biochemical oxygen demand (BOD) level, comprising the steps of:

initially treating said waste water in the presence of microorganisms capable of utilizing said organic contaminants for microorganism replication, oxygen and support media for the microorganisms, and causing said microorganisms to replicate and thereby reduce said incoming BOD level, with a first portion of the microorganisms adhering to said support media and a second portion of the microorganisms remaining suspended in the waste water;

removing at least a part of said second suspended portion of said microorganisms from said initially treated waste water, said removal step comprising adding a synthetic resin polymer to said initially treated waste water to cause agglomerations of some of the microorganisms in said suspended portion and polymer, and thereafter removing the agglomerations from the initially treated waste water using a method selected from the group consisting of straining, screening, centrifuging, and using a dewatering belt; and thereafter further treating said waste water after said removal step in the presence of said microorganisms and oxygen to further reduce said BOD level.

* * * * *